US009378062B2

(12) United States Patent
Ringseth et al.

(10) Patent No.: US 9,378,062 B2
(45) Date of Patent: Jun. 28, 2016

(54) INTERFACE BETWEEN A RESOURCE MANAGER AND A SCHEDULER IN A PROCESS

(75) Inventors: Paul F. Ringseth, Bellevue, WA (US); William R. Messmer, Woodinville, WA (US); Niklas Gustafsson, Bellevue, WA (US); Genevieve Fernandes, Redmond, WA (US); Marko Radmilac, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1018 days.

(21) Appl. No.: 12/487,084

(22) Filed: Jun. 18, 2009

(65) Prior Publication Data

US 2010/0325636 A1    Dec. 23, 2010

(51) Int. Cl.
*G06F 9/46*    (2006.01)
*G06F 9/50*    (2006.01)

(52) U.S. Cl.
CPC .............. *G06F 9/505* (2013.01); *G06F 9/5077* (2013.01); *G06F 9/5088* (2013.01); *G06F 9/5061* (2013.01); *G06F 2209/5022* (2013.01)

(58) Field of Classification Search
CPC .................................. G06F 9/50; G06F 9/505
USPC .......................................................... 718/104
See application file for complete search history.

(56) References Cited

U.S. PATENT DOCUMENTS

| 5,838,968 | A  | * | 11/1998 | Culbert ......................... 718/104 |
| 6,986,137 | B1 | * | 1/2006  | King et al. ..................... 718/104 |
| 7,284,238 | B2 |   | 10/2007 | Inagaki et al. |
| 7,418,585 | B2 |   | 8/2008  | Kissell |
| 7,448,037 | B2 |   | 11/2008 | Arimilli et al. |
| 7,451,450 | B2 |   | 11/2008 | Sankaranarayan et al. |
| 7,474,991 | B2 |   | 1/2009  | DeWitt, Jr. et al. |
| 8,286,178 | B2 | * | 10/2012 | Vaidyanathan ..... G06F 9/45533 718/104 |
| 2004/0268314 | A1 |   | 12/2004 | Kollman et al. |
| 2005/0039183 | A1 | * | 2/2005  | Romero et al. ............... 718/100 |
| 2005/0216908 | A1 | * | 9/2005  | Keohane et al. ............... 717/174 |
| 2006/0130062 | A1 | * | 6/2006  | Burdick ................ G06F 9/4881 718/100 |
| 2006/0195715 | A1 | * | 8/2006  | Herington .......................... 714/4 |
| 2006/0221086 | A1 |   | 10/2006 | Diard |
| 2006/0242389 | A1 | * | 10/2006 | Browning et al. ............. 712/229 |
| 2007/0055830 | A1 | * | 3/2007  | Brenner ................ G06F 9/4881 711/153 |
| 2007/0234365 | A1 |   | 10/2007 | Savit |
| 2008/0052713 | A1 | * | 2/2008  | Flemming ............. G06F 9/5083 718/102 |

(Continued)

OTHER PUBLICATIONS

Klues, et al., "Dynamic Resource Management in a Static Network Operating System", Retrieved at, Department of Computer Science & Engineering—Washington University in St. Louis, Oct. 9, 2006, pp. 15.

(Continued)

*Primary Examiner* — Abdullah Al Kawsar
(74) *Attorney, Agent, or Firm* — Kevin Sullivan; Micky Minhas

(57) ABSTRACT

An interface between a resource manager and schedulers in a process executing on a computer system allows the resource manager to manage the resources of the schedulers. The resource manager communicates with the schedulers using the interface to access statistical information from the schedulers. The statistical information describes the amount of use of the resources by the schedulers. The resource manager also communicates with the schedulers to dynamically allocate and reallocate resources among the schedulers in the same or different processes or computer systems in accordance with the statistical information.

26 Claims, 7 Drawing Sheets

(56) References Cited

U.S. PATENT DOCUMENTS

| | | | |
|---|---|---|---|
| 2008/0098207 A1 | 4/2008 | Reid et al. | |
| 2008/0163203 A1* | 7/2008 | Anand | G06F 9/45533 718/1 |
| 2008/0163366 A1 | 7/2008 | Chinya et al. | |
| 2008/0172673 A1 | 7/2008 | Naik | |
| 2008/0313639 A1* | 12/2008 | Kumar et al. | 718/104 |
| 2009/0049177 A1* | 2/2009 | Iszlai et al. | 709/226 |
| 2010/0088704 A1* | 4/2010 | Ringseth | G06F 9/4881 718/102 |
| 2010/0138208 A1* | 6/2010 | Hattori | G06F 9/45558 703/25 |
| 2011/0191783 A1* | 8/2011 | Le Moal | 718/105 |

OTHER PUBLICATIONS

Barreto, et al., "Programming OS Schedulers with Domain-Specific Languages and Aspects: New Approaches for OS Kernel Engineering", Retrieved at, International Workshop on Aspects, Components, and Patterns for Infrastructure Software at AOSD, 2002, pp. 6.

HP-UX Processor Sets, Retrieved at, A Technical White Paper, Nov. 2001, pp. 1-26.

Schatz, et al., "Model-Based Software and Systems Development", Retrieved at, White Paper, 2008, pp. 3.

Cai, et al., "The Gridkit Distributed Resource Management Framework", Retrieved at, Lecture notes in computer science, vol. 3470, 2005, pp. 11.

Waddington, et al. "Dynamic Analysis and Profiling of Multi-threaded Systems", Retrieved at, pp. 32, Apr. 2008.

"Lauterbach TRACE32 Debugger Shows ThreadX V5 Performance and Trace Data to Speed Development", Retrieved at, pp. 3. Feb. 13, 2007.

Steere, et al., "A Feedback-driven Proportion Allocator for Real-Rate Scheduling", Retrieved at, Proceedings of the 3rd Symposium on Operating Systems Design and Implementation, Feb. 1999, pp. 15.

"CPU Scheduling", Retrieved at, Apr. 2, 2009, pp. 1-19.

Soundararajan, et al., "Dynamic Resource Allocation for Database Servers Running on Virtual Storage", Retrieved at, Apr. 2, 2009, pp. 19.

"Dynamic Feedback Load Balancing Scheduling", Retrieved at, Apr. 2, 2009, pp. 5.

He, et al., "Feedback Control-based Dynamic Resource Management in Distributed Real-Time Systems", Retrieved at, Jul. 7, 2006, pp. 1-20.

Lin et al., "Double-loop Feedback-based Scheduling Approach for Distributed Real-Time Systems", Retrieved at, In HiPC 2003, pp. 10.

Monitoring and Improving Application Performance, Release 1 (9.0.1), Part No. A87504-02, 13 Pages, 2001.

Trace, Cisco Systems, 7 Pages, 2008.

Intel Trace Analyzer and Collector 7.2, 2 Pages, 2008.

* cited by examiner

INTERFACE BETWEEN A RESOURCE MANAGER AND A SCHEDULER IN A PROCESS

BACKGROUND

Processes executed in a computer system often have tasks with different processing demands and priorities. In order to operate as desired, a process may expend significant overhead to ensure that suitable resources are allocated to tasks based on the demands and priorities of the tasks. This overhead may include the use of one or more schedulers that schedule tasks of the process for execution in the computer system. The execution of tasks with schedulers may vary based on the processing capabilities and/or processing demands of the computer system at any given time. As a result, resource allocations to schedulers may not be optimal for some processing conditions.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An interface between a resource manager and schedulers in a process executing on a computer system allows the resource manager to manage the resources of the schedulers. The resource manager communicates with the schedulers using the interface to access statistical information from the schedulers. The statistical information describes the amount of use of the resources by the schedulers. The resource manager also communicates with the schedulers to dynamically allocate and reallocate resources among the schedulers in the same or different processes or computer systems in accordance with the statistical information.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
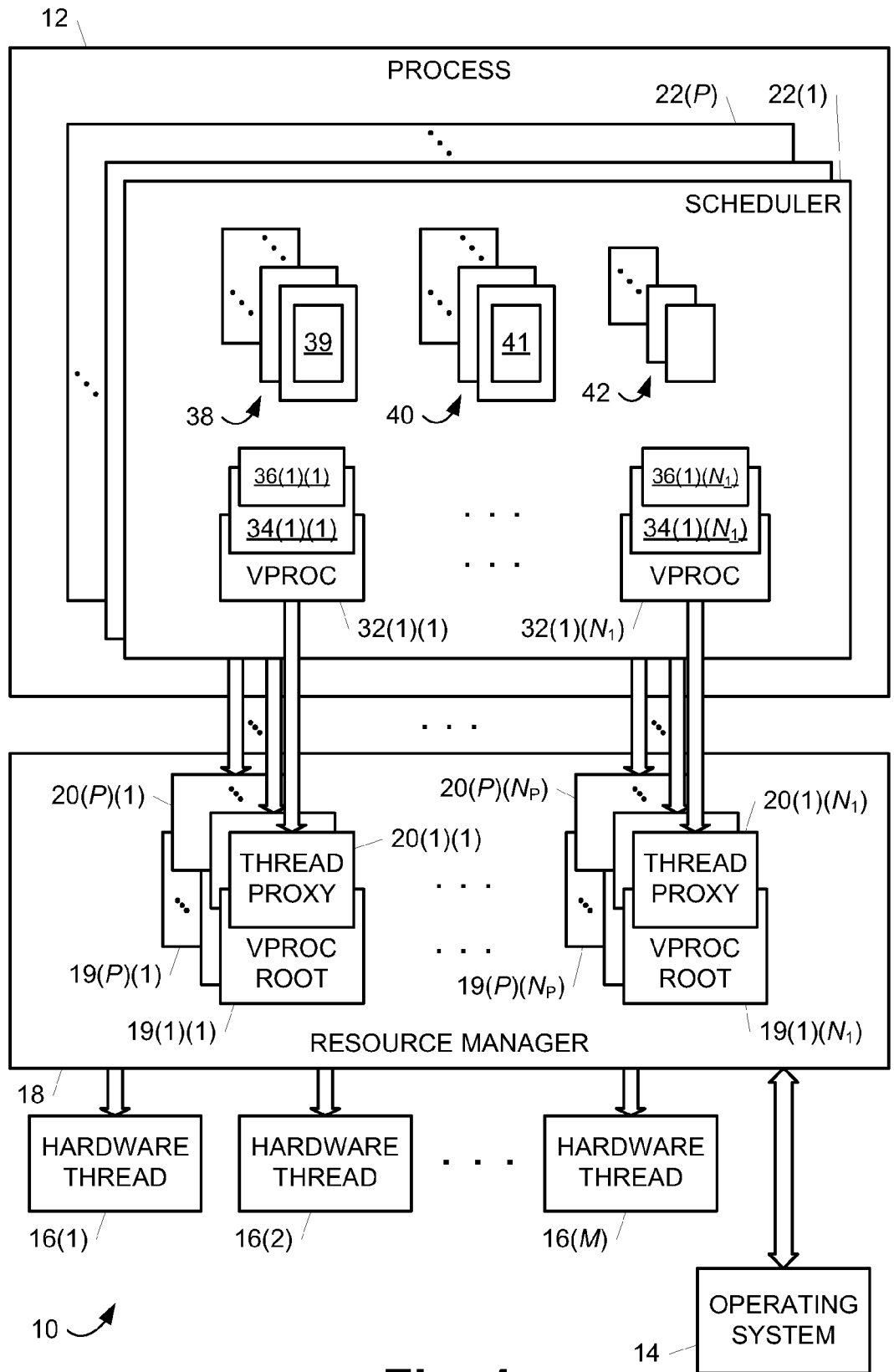
FIG. 1 is a block diagram illustrating an embodiment of a set of schedulers in a process in a runtime environment.

FIG. 1 is a block diagram illustrating an embodiment of a set of schedulers 22(1)-22(P) in a process 12 in a runtime environment 10 where P is an integer that is greater than or equal to one and denotes the Pth scheduler 22(P). Each scheduler 22 is configured to schedule tasks for execution by processing resources using execution contexts.

Runtime environment 10 represents a runtime mode of operation in a computer system, such as a computer system 100 shown in FIG. 7 and described in additional detail below, where the computer system is executing instructions. The computer system generates runtime environment 10 from a runtime platform such as a runtime platform 122 shown in FIG. 7 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), and a resource manager 18. Runtime environment 10 allows tasks from process 12 to be executed, along with tasks from any other processes (e.g., additional processes 12 shown in FIG. 6) that co-exist with process 12, using OS 14, resource manager 18, and hardware threads 16(1)-16(M). Runtime environment 10 operates in conjunction with OS 14 and/or resource manager 18 to allow process 12 to obtain processing and other resources of the computer system (e.g., hardware threads 16(1)-16(M), execution contexts, memory, and/or network bandwidth).

Runtime environment 10 includes a scheduler function that generates each scheduler 22. In one embodiment, the scheduler function is implemented as a scheduler application programming interface (API). In other embodiments, the scheduler function may be implemented using other suitable programming constructs. When invoked, the scheduler function creates a scheduler 22 in process 12 where the scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads, fibers (i.e., lightweight threads), or child processes). Process 12 obtains access to the processing and other resources in the computer system such as hardware threads 16(1)-16(M), execution contexts, memory, and/or network bandwidth from OS 14 and/or resource manager 18. Process 12 causes tasks to be executed using the processing and other resources. In the embodiment of FIG. 1, the processing resources include virtual processors 32(1)-32(N) where N is an integer greater than or equal to two and denotes the Nth virtual processor 32(N).

Process 12 generates work in tasks of variable length where each task is associated with an execution context in a scheduler 22. More than one task may be associated with a given execution context. Each task includes a sequence of instructions that perform a unit of work when executed by the computer system. Each execution context forms a thread, fibre (i.e., a lightweight thread), or analogous OS concept such as child process that executes associated tasks on allocated processing resources. Each execution context includes program state and machine state information. Execution contexts may terminate when there are no more tasks left to execute. For each task, runtime environment 10 and/or process 12 either assign the task to a scheduler 22 to be scheduled for execution or otherwise cause the task to be executed without using a scheduler 22.

Process 12 may be configured to operate in one or more computer systems based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to each scheduler 22 and process 12 and allocates memory from a memory system, such as a memory system 104 shown in FIG. 7 and described in additional detail below, to each scheduler 22 and process 12. OS 14 may allocate memory from the memory system in any suitable fixed or variable sizes (e.g., pages of 4 kilobytes (KB) to 19 KB).

Hardware threads 16 reside in execution cores of a set or one or more processor packages (e.g., processor packages 102 shown in FIG. 7 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource manager 18 allocates processing resources to a process 12 by assigning one or more hardware threads 16 to process 12. Resource manager 18 creates a set of virtual processor roots 19 and a set of thread proxies 20 for each scheduler 22. Each virtual processor root 19 manages a corresponding virtual processor 32 in a scheduler 22, forms an abstraction of a hardware thread 16, and executes a corresponding thread proxy 20. Each thread proxy 20 forms an abstraction of an execution context from OS 14 and executes a set of execution contexts of a scheduler 22 on a corresponding virtual processor root 19. The execution contexts of a scheduler 22 execute on thread proxies 20 which in turn execute on execution contexts from OS 14 on hardware threads 16. Resource manager 18 exists separately from OS 14 in the embodiment of FIG. 1. In other embodiments, resource manager 18 or some or all of the functions thereof may be included in OS 14.

Process 12 implicitly or explicitly causes each scheduler 22 to be created via the scheduler function provided by runtime environment 10. An instance of scheduler 22 may be implicitly created when process 12 uses APIs available in the computer system or programming language features. In response to the API or programming language features, runtime environment 10 creates a scheduler 22 with a default policy. To explicitly create a scheduler 22, process 12 may invoke the scheduler function provided by runtime environment 10 and specifies a policy for the scheduler 22.

Each scheduler 22 interacts with OS 14 and resource manager 18 to negotiate processing and other resources of the computer system in a manner that is transparent to process 12. OS 14 and/or resource manager 18 initially allocates memory to each scheduler 22 in response to requests from one or more memory allocators (not shown) in each scheduler 22 and may dynamically adjust the memory allocations as described below. OS 14 and/or resource manager 18 also initially allocates hardware threads 16, execution contexts, and/or network bandwidth to each scheduler 22 based on supply and demand and any policies of each scheduler 22 may dynamically adjust these resources as described below.

In the embodiment shown in FIG. 1, each scheduler 22 manages the processing resources by creating virtual processors 32 that form an abstraction of underlying virtual processor roots 19 and hardware threads 16. Resource manager 18 maps the virtual processors 32 onto virtual processor roots 19. Resource manager 18 multiplexes virtual processor roots 19 onto hardware threads 16 by mapping each virtual processor root 19 to a hardware thread 16. Resource manager 18 may map more than one virtual processor root 19 onto a particular hardware thread 16 but maps only one hardware thread 16 to each virtual processor root 19. In other embodiments, resource manager 18 manages processing resources in other suitable ways to cause instructions of process 12 to be executed by hardware threads 16.

Prior to executing tasks, each scheduler 22 obtains execution contexts 34 and 38 from runtime environment 10, resource manager 18, and/or OS 14. Available virtual processors 32 locate and execute execution contexts 34 and 38 to begin executing tasks. The set of execution contexts in each scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to a scheduler 22, tasks are assigned to execution contexts 34 or 38 that execute them to completion or a blocking point (e.g. waiting for a message or a stolen child task to complete) on virtual processors 32 before picking up new tasks. An execution context 34 executing on a virtual processor 32 may also unblock other execution contexts 40 by generating data, a message, or an event that will be used by another execution context 40.

Figure 5:
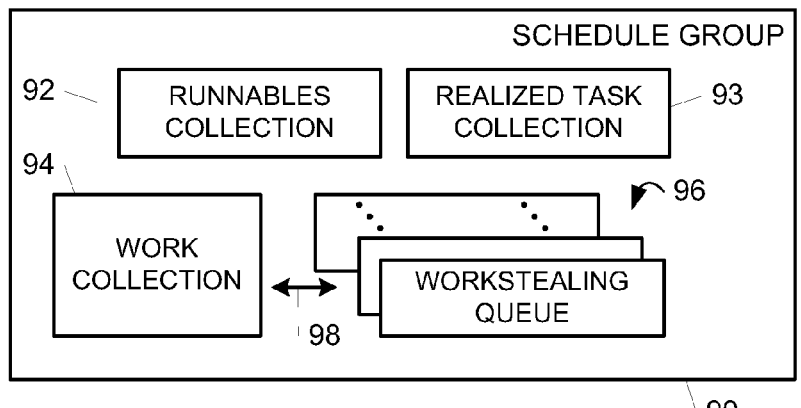
FIG. 5 is a block diagram illustrating an embodiment of a schedule group for use in a scheduler.

Each task in a scheduler 22 may be realized (e.g., realized tasks 36 and 39), which indicates that an execution context 34 or 38 has been or will be attached to the task and the task is ready to execute. Realized tasks typically include light weight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel, parallel for, begin, and finish). Each scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 5 described below.

Upon completion, blocking, or other interruption (e.g., explicit yielding or forced preemption) of a task 36 associated with an execution context 34 running on a virtual processor 32, the virtual processor 32 becomes available to execute another realized task 39 or unrealized task 42. A scheduler 22 searches for a runnable execution context 38, a realized task 39, or an unrealized task 42 to attach to the available virtual processor 32 for execution in any suitable way. For example, a scheduler 22 may first search for a runnable execution context 38 to execute before searching for a realized task 39 or an unrealized task 42 to execute. A scheduler 22 continues attaching execution contexts 38 to available virtual processors 32 for execution until all execution contexts 38 of the scheduler 22 have been executed. In other embodiments, runnable execution contexts 38 and realized tasks 39 may be merged into single concept from the perspective of schedulers 22.

Each scheduler 22 includes one or more memory allocators that cause memory to be allocated for internal data structures of scheduler 22 (not shown) and tasks 36 of execution contexts 34 executing on virtual processors 34. The memory allocators request and receive access to pages of memory from OS 14 and/or resource manager 18 and allocate objects or other suitable portions of memory from the pages to tasks 36 executing on virtual processors 32. OS 14 and/or resource manager 18 may provide pages in predefined sizes of memory such as page sizes of 4 kilobytes (KB) to 19 KB to the memory allocators.

Figure 2:
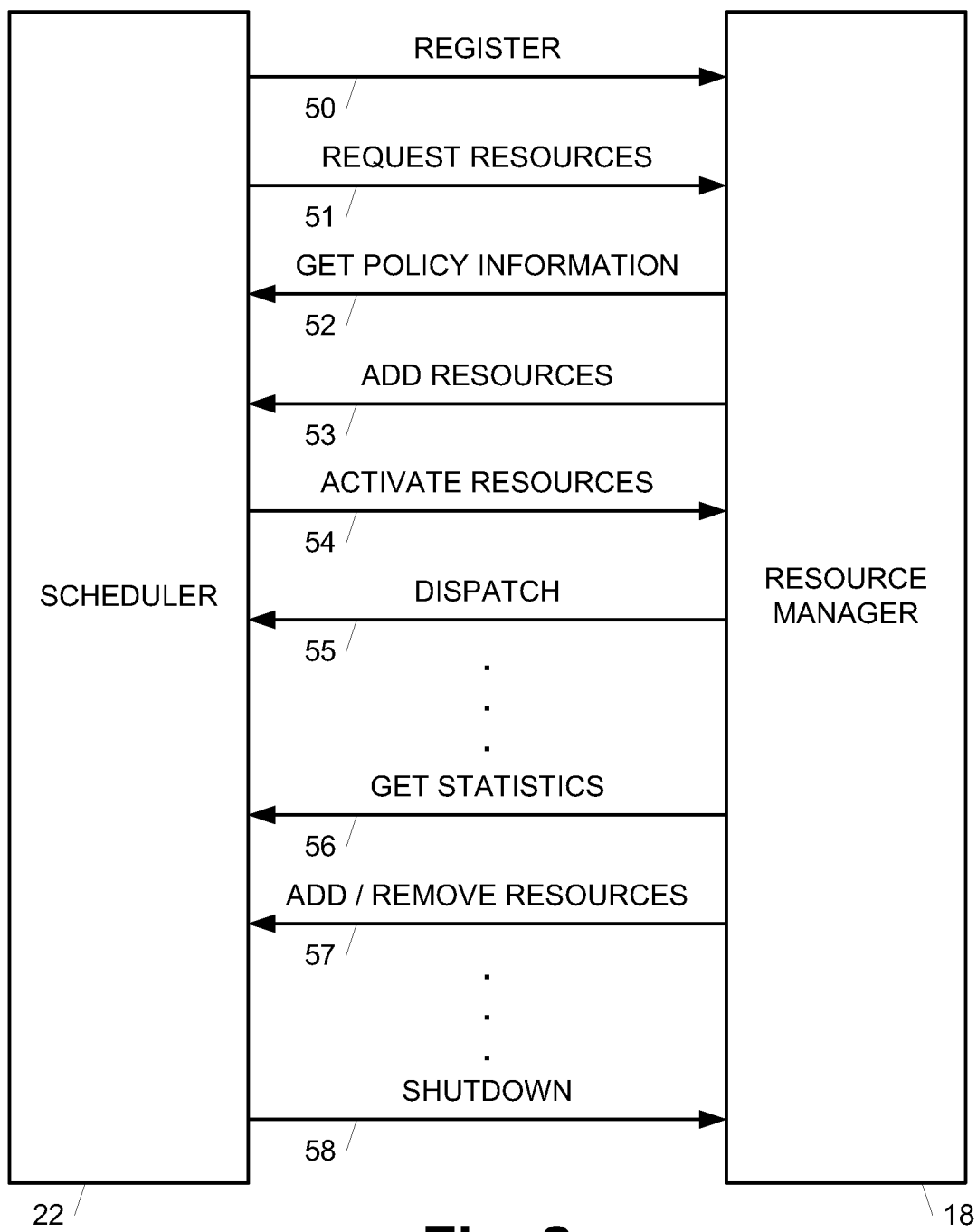
FIG. 2 is a block diagram illustrating an embodiment of an interface between a scheduler and a resource manager.

The process of dynamically allocating processing resources to schedulers 22 will now be described with reference to FIG. 2 which is a block diagram illustrating an embodiment of an interface between each scheduler 22 and resource manager 18. Upon being created by process 12, a scheduler 22 registers with resource manager 18 as indicated by an arrow 50 and requests processing resources from resource manager 18 as indicated by an arrow 51.

Resource manager 18 responds to the request by obtaining policy information about the scheduler 22 from the scheduler 22 as indicated in by an arrow 52. The policy information may include minimum and maximum numbers of processing resources desired by the scheduler 22 and an oversubscription factor of the scheduler 22. The oversubscription factor indicates a desired number of virtual processor roots 19 and thread proxies 20 assigned to each hardware thread 16 for the scheduler 22. Resource manager 18 determines a number of processing resources to provide to the scheduler using the policy information, the number of processing resources available, and the numbers of processing resources assigned to other schedulers 22.

After determining the number of processing resources to provide to the scheduler 22, resource manager 18 adds the processing resources to the scheduler 22 as indicated by an arrow 53. To do so, resource manager 18 provides an array of interfaces to virtual processor roots 19 and a count of the number of array elements to the scheduler 22. The interfaces include information about the topology of the hardware threads 16 corresponding to the virtual processor roots 19.

Scheduler 22 creates a virtual processor 32 for each interface to a virtual processor root 19 and maps each virtual processor 32 to a corresponding virtual processor root 19. Scheduler 22 activates each virtual processor 32 by causing a thread proxy 20 to be initiated on a corresponding virtual processor root 19 and specifying an execution context 34 for execution as indicated by an arrow 54. Once initiated, each thread proxy 20 dispatches the execution context 34 specified by the scheduler 22 to begin execution of the execution context 34 as indicated by an arrow 55. Subsequent to each initial execution context 34 being dispatched, virtual processors 32 execute tasks as described above until no tasks are found to execute, until being removed from scheduler 22, or until scheduler 22 shuts down.

Resource manager 18 may periodically or continuously monitor the amount of use of processing resources by each scheduler 22 and add processing resources to or remove processing resources from one or more schedulers 22. Resource manager 18 monitors the amount of use of processing resources by a scheduler 22 by providing a request for statistics to scheduler 22 as indicated by an arrow 56. In response to the request, scheduler 22 provides statistical information that describes the amount of processing performed by the processing resources of scheduler 22.

In one embodiment, the statistical information includes the number of tasks that have arrived in scheduler 22 since the last request for statistics, the number of tasks that have been completed by scheduler 22 since the last request for statistics, and a total number of uncompleted tasks in scheduler 22. Each virtual processor 32 maintains a current arrived count and a current completed count to track the numbers of tasks that arrive and complete on each virtual processor 32. Each virtual processor 32 also stores the current arrived count as a previous arrived count and the current completed count as a previous completed after each request for statistics. Each virtual processor 32 may store the counts in virtual processor local storage that is writeable only by a corresponding virtual processor and maintain the counts without resetting any of the counts in respond to the requests. If a virtual processor 32 is removed from scheduler 22, scheduler 22 stores the counts from the removed virtual processor 32 and includes the stored counts in the statistical information gathered in response to the next request from resource manager 18.

Scheduler 22 accesses the counts from each virtual processor 32. Scheduler 22 generates the number of tasks that have arrived in scheduler 22 since the last request for statistics as a sum of all of the current arrived counts minus a sum of all of the previous arrived counts. Scheduler 22 generates the number of tasks that have been completed by scheduler 22 since the last request for statistics as a sum of all of the current completed counts minus a sum of all of the previous completed counts. Scheduler 22 generates the total number of uncompleted tasks in scheduler 22 as a sum of all of the current arrived counts minus a sum of all of the current completed counts.

In some embodiments, scheduler 22 may allow external execution contexts from process 12 to be inducted into scheduler 22 to execute tasks of the scheduler 22. In these embodiments, each external execution context also stores current arrived and current completed counts and previous arrived and previous completed counts in thread local storage (not shown) similar to the way each virtual processor 32 stored the counts in virtual processor local storage as described above. For each request for statistics, scheduler 22 reads the current arrived and current completed counts and previous arrived and previous completed counts from the thread local storage of each external count and includes these counts into the generated statistics.

External execution contexts may exit the scheduler 22 at any time. When external execution contexts exit the scheduler 22, the exiting external execution contexts store corresponding indicators with the corresponding counts in the thread local storages. Each indicator indicates that a corresponding external execution context has exited the scheduler 22. On each request for statistics, scheduler 22 detects any indicators that indicate that an external execution context has exited the scheduler 22 and deletes the counts of all external execution contexts that exited the scheduler 22 after reading the counts and including the counts in the generated statistics.

In other embodiments, each scheduler 22 may use other mechanisms to track the amount of processing of the processing resources of scheduler 22 and/or may provide other types of statistical information that describes the amount of processing of the processing resources to resource manager 18.

Resource manager 18 may adjust the number of processing resources in a scheduler by adding processing resources to or removing processing resources from the scheduler 22 in accordance with the statistical information from the scheduler 22, the combined statistical information from all schedulers 22, the policy information of the scheduler 22, and/or the policy information of the remaining schedulers 22 as indicated by an arrow 57. Resource manager 18 may attempt to balance the amounts of processing performed by each scheduler 22 by allocating and reallocating processing resources between schedulers 22. For example, resource manager 18 may add one or more processing resources to one or more schedulers 22 with the most tasks to execute, the highest rates of arrived tasks, or the lowest rates of completed tasks. Likewise, resource manager 18 may remove one or more processing resources from one or more schedulers 22 with the fewest tasks to execute, the lowest rates of arrived tasks, or the highest rates of completed tasks.

Resource manager 18 adds processing resources to a scheduler 22 by providing an array of interfaces to virtual processor roots 19 and a count of the number of array elements to the scheduler 22 as described above. Scheduler 22 creates a virtual processor 32 for each interface to a virtual processor root 19, maps each virtual processor 32 to a corresponding virtual processor root 19, and activates each virtual processor 32 as described above.

Resource manager 18 removes processing resources from a scheduler 22 by providing an array of interfaces to virtual processor roots 19 that are to be removed and a count of the number of array elements to the scheduler 22. Scheduler 22 causes execution contexts 34 that are executing on the virtual processors 32 that correspond to the virtual processor roots 19 that are to be removed to exit and removes the virtual processors 32. The execution contexts 34 that exited may block and resume execution on other virtual processors 32 in scheduler 22. Resource manager 18 may reallocate the removed processing resources to other schedulers 22.

A scheduler 22 may shut down at any time as indicated by an arrow 58. The scheduler 22 notifies resource manager 18 of the shut down, and resource manager 18 reclaims all processing resources allocated to the scheduler 22. Resource manager 18 may reallocate the processing resources to other schedulers 22.

Resource manager 18 may also dynamically allocate or manage the allocation of other resources including execution contexts, memory, and network bandwidth to schedulers 22. As with processing resources, resource manager 18 may make resource allocation decisions based on policy information from one or more schedulers 22. Resource manager 18 provides or causes the resources to be provided to schedulers 22 and may periodically or continuously monitor the use of these resources by each scheduler 22.

For execution context allocations, OS 14, resource manager 18 and/or scheduler 22 may track a number of execution contexts allocated to a scheduler 22. Resource manager 18 may use the statistics described above for processing resources to determine an amount of use of the execution contexts and decide whether to adjust (i.e., increase or decrease) the number of execution contexts in a scheduler 22 based on the amount of use.

For memory allocations, OS 14, resource manager 18 and/or scheduler 22 may track an amount of memory allocated to process 12 and/or each scheduler 22 in process 12. Resource manager 18 may use the statistics described above for processing resources to determine an amount of use of the memory and decide whether to adjust (i.e., increase or decrease) the amount of memory allocated to each scheduler 22 based on the amount of use.

For network bandwidth allocations, OS 14, resource manager 18 and/or scheduler 22 may track an amount of network bandwidth used by process 12 and/or each scheduler 22 in process 12. Resource manager 18 may use the statistics described above for processing resources to determine an amount of network bandwidth use and decide whether to adjust (i.e., increase or decrease) the amount of network bandwidth allocated to each scheduler 22 based on the amount of use.

Figure 3A:
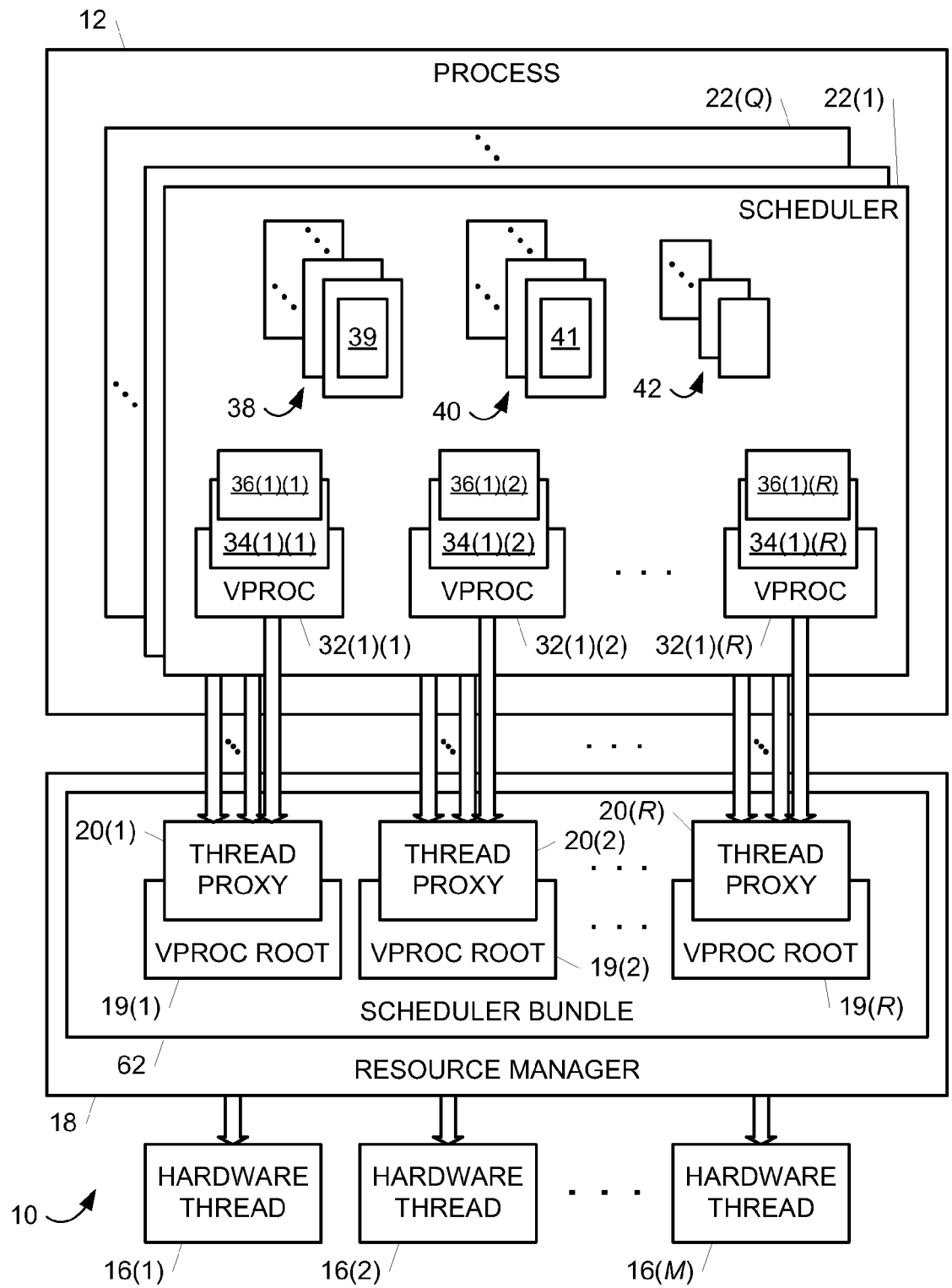
FIGS. 3A-3B are block diagrams illustrating embodiments of a scheduler bundle in a runtime environment.
Figure 3B:
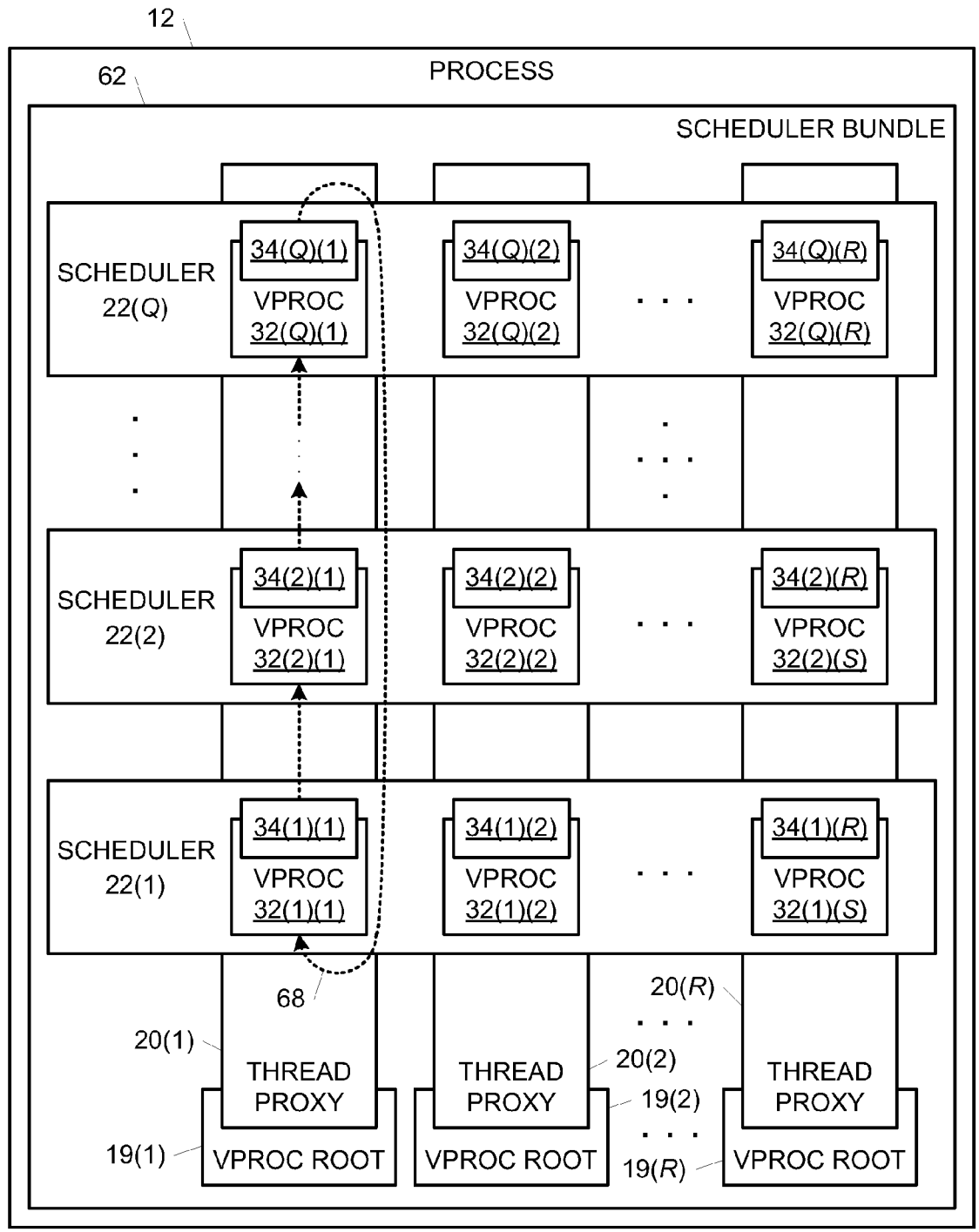

Any set or subset of schedulers 22 in process 12 may be configured into one or more scheduler bundles 62 in resource manager 18 as shown in the embodiments of FIGS. 3A-3B. FIGS. 3A-3B are block diagrams illustrating embodiments of a scheduler bundle 62 with virtual processor roots 19(1)-19 (R) and thread proxies 20(1)-20(R) in runtime environment 10 where R is an integer that is greater than or equal to one. In the embodiments of FIGS. 3A-3B, each thread proxy 20 provides quanta of execution of a corresponding virtual processor root 19 to execution contexts 34 on corresponding virtual processors 32 across a set of schedulers 22(1)-22(Q) of the scheduler bundle 62, where Q is an integer that is greater than or equal to one.

In the embodiment of FIGS. 3A-3B, runtime environment 10 includes a scheduler bundle function that generates scheduler bundle 62 with virtual processor roots 19 and thread proxies 20 in addition to the scheduler function that generates schedulers 22 for inclusion in scheduler bundle 62. In one embodiment, the scheduler bundle function is implemented as an application programming interface (API). In other embodiments, the scheduler bundle function may be implemented using other suitable programming constructs. When invoked, the scheduler bundle function creates scheduler bundle 62 to manage one or more schedulers 22 in scheduler bundle 62. The scheduler function creates a scheduler 22 in scheduler bundle 62, where each scheduler 22 operates to schedule execution contexts of process 12 for execution on virtual processors 32 of the scheduler 22. The execution contexts execute on thread proxies 20 which in turn execute on execution contexts on hardware threads 16.

Resource manager 18 includes the scheduler bundle function in one embodiment and thus, creates and manages scheduler bundle 62, a set of virtual processor roots 19(1)-19(R), where each virtual processor root 19 manages a corresponding set of virtual processors 32 across the schedulers 22 in scheduler bundle 62, and a set of thread proxies 20(1)-20(R), where each thread proxy 20 executes a corresponding set of scheduler execution contexts across the schedulers 22 in scheduler bundle 62 on a corresponding virtual processor root 19. Resource manager 18 causes thread proxies 20(1)-20(R) on corresponding virtual processor roots 19(1)-19(R) to be executed on underlying execution contexts obtained from the OS on hardware threads 16.

Process 12 implicitly or explicitly causes scheduler bundle 62, virtual processor roots 19(1)-20(R), thread proxies 20(1)-21(R), and schedulers 22(1)-22(Q) to be created via the corresponding functions provided by runtime environment 10 and/or resource manager 18. Scheduler bundle 62, virtual processor roots 19, thread proxies 20, and schedulers 22 may be implicitly created when process 12 uses APIs available in the computer system or programming language features. In response to the API or programming language features, runtime environment 10 creates scheduler bundle 62, virtual processor roots 19, thread proxies 20, and schedulers 22 that inherit the policies of scheduler bundle 62. To explicitly create scheduler bundle 62, virtual processor roots 19, thread proxies 20, and schedulers 22, process 12 may invoke the scheduler bundle and scheduler functions provided by runtime environment 10 and specify one or more policies for scheduler bundle 62, virtual processor roots 19, thread proxies 20, and schedulers 22.

Scheduler bundle 62 manages virtual processor roots 19 and corresponding thread proxies 20 to share virtual processor roots 19 and thread proxies 20 among all schedulers 22(1)-22(Q) in scheduler bundle 62. Scheduler bundle 62 may share virtual processor roots 19 and thread proxies 20 among schedulers 22(1)-22(Q) cooperatively, preemptively, or with another suitable type of time slicing. As part of creating scheduler bundle 62, resource manager 18 allocates virtual processor roots 19 and thread proxies 20 to scheduler bundle 62 based on supply and demand and any policies of scheduler bundle 62. In one embodiment, scheduler bundle 62 creates each scheduler 22(1)-22(Q). In other embodiments, one or more of scheduler 22(1)-22(Q) that are external to scheduler bundle 62 may invoke a programming API or other suitable programming construct to attach to scheduler bundle 62.

In one embodiment, process 12 adds each scheduler 22(1)-22(Q) to scheduler bundle 62 with the same set of scheduler policies. In another embodiment, process 12 adds each scheduler 22(1)-22(Q) to scheduler bundle 62 with a different set of scheduler policies. Each scheduler 22 receives virtual processors 32(1)-32(R) where each virtual processor 32 forms an abstraction of underlying virtual processor roots 19 and hardware threads 16. Each scheduler 22 also receives information that maps virtual processors 32(1)-32(R) of a scheduler 22 to corresponding virtual processor roots 19(1)-20(R). As shown in FIG. 3B, virtual processors 32(1)(1)-32(Q)(1) from respective schedulers 22(1)-22(Q) map to virtual processor root 19(1), virtual processors 32(1)(2)-32(Q)(2) from respective schedulers 22(1)-22(Q) map to virtual processor root 19(2), and so on.

Scheduler bundle 62 dispatches the execution contexts 34 on thread proxies 20 and schedules thread proxies 20 on virtual processor roots 19 which execute on execution contexts associated with hardware threads 16. Each thread proxy 20 switches between execution of execution contexts 34 on virtual processors 32 on the corresponding virtual processor root 19. Each thread proxy 20 causes a single execution context 34 to be executed at any given time but periodically performs context switches between execution of execution contexts 34 to execute each of the set of execution contexts 34 on virtual processors 32 that correspond to the virtual processor root 19 of the thread proxy 20. Each thread proxy 20 provides a quantum of execution upon dispatching an execution context 34 of a scheduler 22. The quantum of execution may be expressed in time (e.g., 50 ms), by a number of tasks to be executed, or by any other suitable metric. The quantum of execution may be the same or different for each dispatched execution context 34.

As shown in FIG. 3B, thread proxy 20(1) switches between execution of execution contexts 34(1)(1)-34(Q)(1) from respective schedulers 22(1)-22(Q), thread proxy 20(2) switches between execution of execution contexts 34(1)(2)-34(Q)(2) from respective schedulers 22(1)-22(Q), and so on. As shown by an arrow 68, for example, thread proxy 20(1) dispatches execution context 34(1)(1) for a quantum of execution on virtual processor root 19(1) and, once execution context 34(1)(1) detects that quantum has expired and yields back to thread proxy 20(1), thread proxy 20(1) dispatches execution context 34(2)(1) for a quantum of execution on virtual processor root 19(1). Thread proxy 20(1) continues the process of dispatching a next one of the set of execution contexts 34(1)(1)-34(Q)(1) each time a current one of the set of execution context 34(1)(1)-34(Q)(1) yields back to thread proxy 20(1). Referring back to FIG. 3A, scheduler 22 executes execution contexts 34 on virtual processors 32 which are, in turn, executed by thread proxies 20 on virtual processor roots 19.

Figure 4:
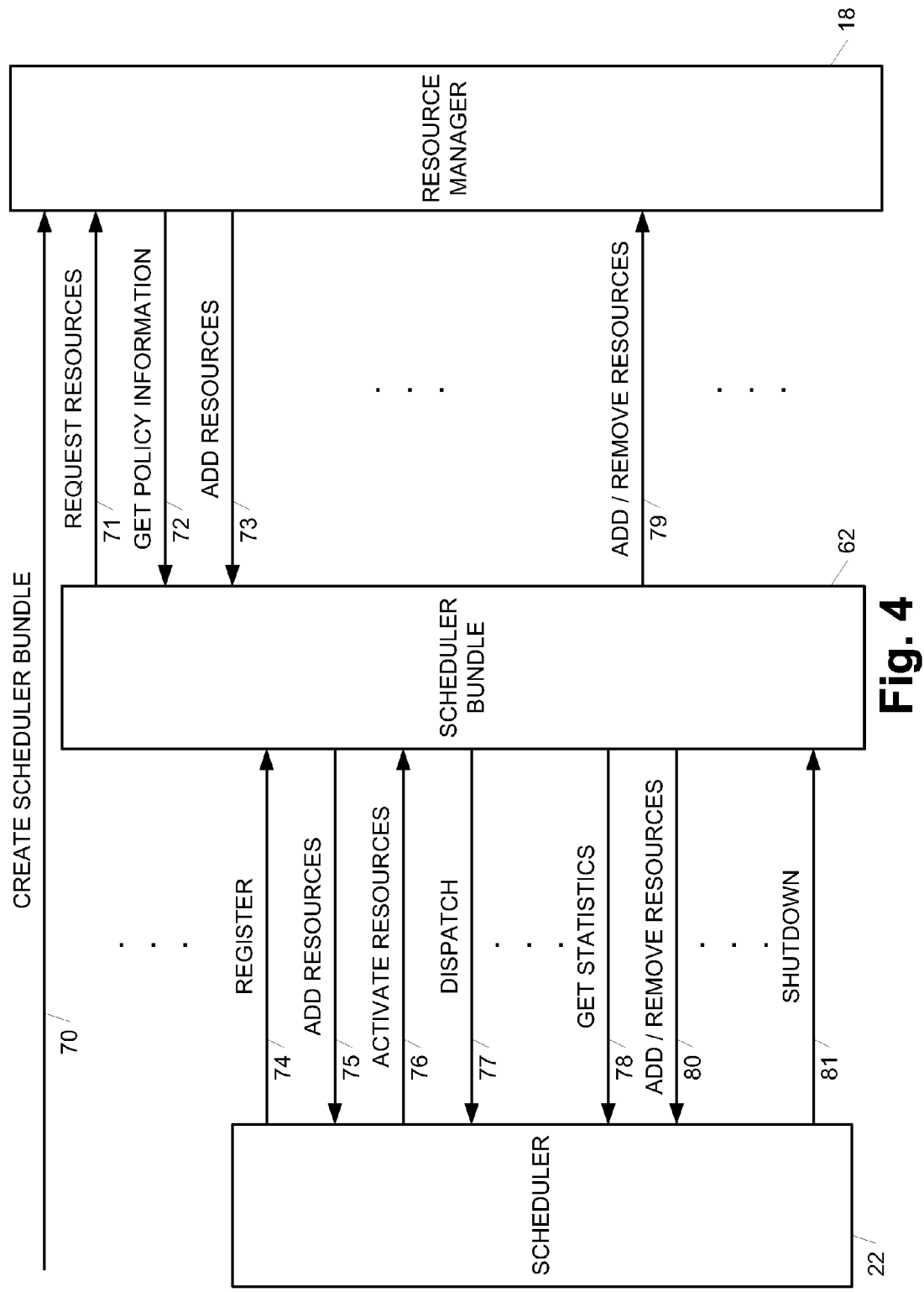
FIG. 4 is a block diagram illustrating an embodiment of interfaces between a scheduler, a scheduler bundle, and a resource manager.

The process of dynamically allocating processing resources to schedulers 22 in scheduler bundles 62 will now be described with reference to FIG. 4 which is a block diagram illustrating an embodiment of interfaces between a scheduler 22, a scheduler bundle 62, and a resource manager 18. Process 12 creates scheduler bundle 62 as indicated by an arrow 70. Scheduler bundle 62 requests processing resources from resource manager 18 as indicated by an arrow 71.

Resource manager 18 responds to the request by obtaining policy information about the scheduler bundle 62 from the scheduler bundle 62 as indicated in by an arrow 72. The policy information may include minimum and maximum numbers of processing resources desired by the scheduler bundle 62 and an oversubscription factor of the scheduler bundle 62. The oversubscription factor indicates a desired number of virtual processor roots 19 and thread proxies 20 assigned to each hardware thread 16 for the scheduler bundle 62. Resource manager 18 determines a number of processing resources to provide to the scheduler bundle 62 using the policy information, the number of processing resources available, and the numbers of processing resources assigned to other schedulers 22 and scheduler bundles 62.

After determining the number of processing resources to provide to the scheduler bundle 62, resource manager 18 adds the processing resources to the scheduler bundle 62 as indicated by an arrow 73. The processing resources include virtual processor roots 19.

After scheduler bundle 62 is created and provided with processing resources, a scheduler 22 registers with the scheduler bundle 62 to add itself to the scheduler bundle 62 as indicated by an arrow 74. For each added scheduler 22, scheduler bundle 62 provides processing resources in the form of an array of interfaces to virtual processor roots 19 and a count of the number of array elements to the scheduler 22 as indicated by an arrow 75. The interfaces include information about the topology of the hardware threads 16 corresponding to the virtual processor roots 19. Scheduler 22 creates a virtual processor 32 for each interface to a virtual processor root 19 and maps each virtual processor 32 to a corresponding virtual processor root 19. Scheduler 22 activates each virtual processor 32 by calling a thread proxy 20 on a corresponding virtual processor root 19 and specifying an execution context 34 for execution as indicated by an arrow 76. Each thread proxy 20 dispatches the execution context 34 specified by the scheduler 22, as indicated by an arrow 77, when the quantum for the scheduler 22 on the corresponding virtual processing root 19 occurs to begin execution of the execution context 34. Subsequent to each initial execution context 34 being dispatched, virtual processors 32 execute tasks during the quanta provided by scheduler bundle 62 as described above until no tasks are found to execute, until being removed from scheduler 22, or until scheduler 22 shuts down.

Scheduler bundle 62 may periodically or continuously monitor the amount of use of processing resources by each scheduler 22 of the scheduler bundle 62 and add processing resources to or remove processing resources from each of schedulers 22. Scheduler bundle 62 monitors the amount of use of processing resources by a scheduler 22 by providing a request for statistics to scheduler 22 as indicated by an arrow 78. In response to the request, scheduler 22 provides statistical information that describes the amount of processing of the processing resources of scheduler 22 as described above with reference to FIG. 2.

Scheduler bundle 62 may add processing resources to or remove processing resources from each of the schedulers 22 of scheduler bundle 62 in accordance with the statistical information from all schedulers 22 and the policy information of scheduler bundle 62 as indicated by an arrow 80. For example, resource manager 18 may add one or more processing resources to each of the schedulers 22 of the scheduler bundle 62 to increase the processing capabilities of the schedulers 22 of the scheduler bundle 62 or remove one or more processing resources from each scheduler 22 of the scheduler bundle 62 to decrease the processing capabilities of the schedulers 22 of the scheduler bundle 62.

Scheduler bundle 62 adds processing resources to each scheduler 22 of the scheduler bundle 62 by providing an array of interfaces to virtual processor roots 19 and a count of the number of array elements to each scheduler 22. Each scheduler 22 creates a virtual processor 32 for each interface to a virtual processor root 19, maps each virtual processor 32 to a corresponding virtual processor root 19, and activates each virtual processor 32 as described above.

Scheduler bundle 62 removes processing resources from each scheduler 22 of the scheduler bundle 62 by providing an array of interfaces to virtual processor roots 19 that are to be removed and a count of the number of array elements to each scheduler 22. Each scheduler 22 causes execution contexts 34 that are executing on the virtual processors 32 that correspond to the virtual processor roots 19 that are to be removed to exit and removes the virtual processors 32. The execution contexts 34 that exited may block and resume execution on other virtual processors 32 in scheduler 22.

Scheduler bundle 62 may also use the statistical information to determine whether or not a given scheduler 22 should be provide quanta of execution by a thread proxy 20. Scheduler bundle 62 may avoid providing quanta of execution to schedulers 22 with no tasks to execute.

A scheduler 22 may shut down at any time as indicated by an arrow 81. The scheduler 22 notifies scheduler bundle 62 of the shut down, and scheduler bundle 62 reclaims all processing resources allocated to the scheduler 22.

In the above embodiments, each scheduler 22 may operate as a cooperative scheduler where process 12 and other processes are associated with virtual processors 32 in a controlled way. In other embodiments, each scheduler 22 may operate as another type of scheduler such as a preemptive scheduler.

Resource manager 18 and/or scheduler bundle 62 may also dynamically allocate or manage the allocation of other resources including execution contexts, memory, and network bandwidth for each scheduler 22 in scheduler bundle 62. As with processing resources, resource manager 18 and/or scheduler bundle 62 may make resource allocation decisions based on policy information from schedulers 22. Resource manager 18 and/or scheduler bundle 62 provides or causes the resources to be provided to schedulers 22 and may periodically or continuously monitor the use of these resources by schedulers 22. Resource manager 18 and/or scheduler bundle 62 tracks the amount of use of the resources and adjusts the amount of the resources using the statistics and policies of scheduler 22 as described above.

In one embodiment, process 12 (shown in FIGS. 1 and 3A) organizes tasks into one or more schedule groups 90 (shown in FIG. 5) and presents schedule groups 90 to scheduler 22 as shown in FIG. 5. In other embodiments, process 12 organizes tasks into collections for each virtual processor 32 of scheduler 22 in other suitable ways.

FIG. 5 is a block diagram illustrating an embodiment of a schedule group 90 for use in a scheduler 22. Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 39 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42 with no assigned execution context 34 or 38.

Using the embodiment of FIG. 5, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 39 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 39 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

In other embodiments, schedule groups 90 contain other suitable numbers, types, and/or configurations of task collections.

Figure 6:
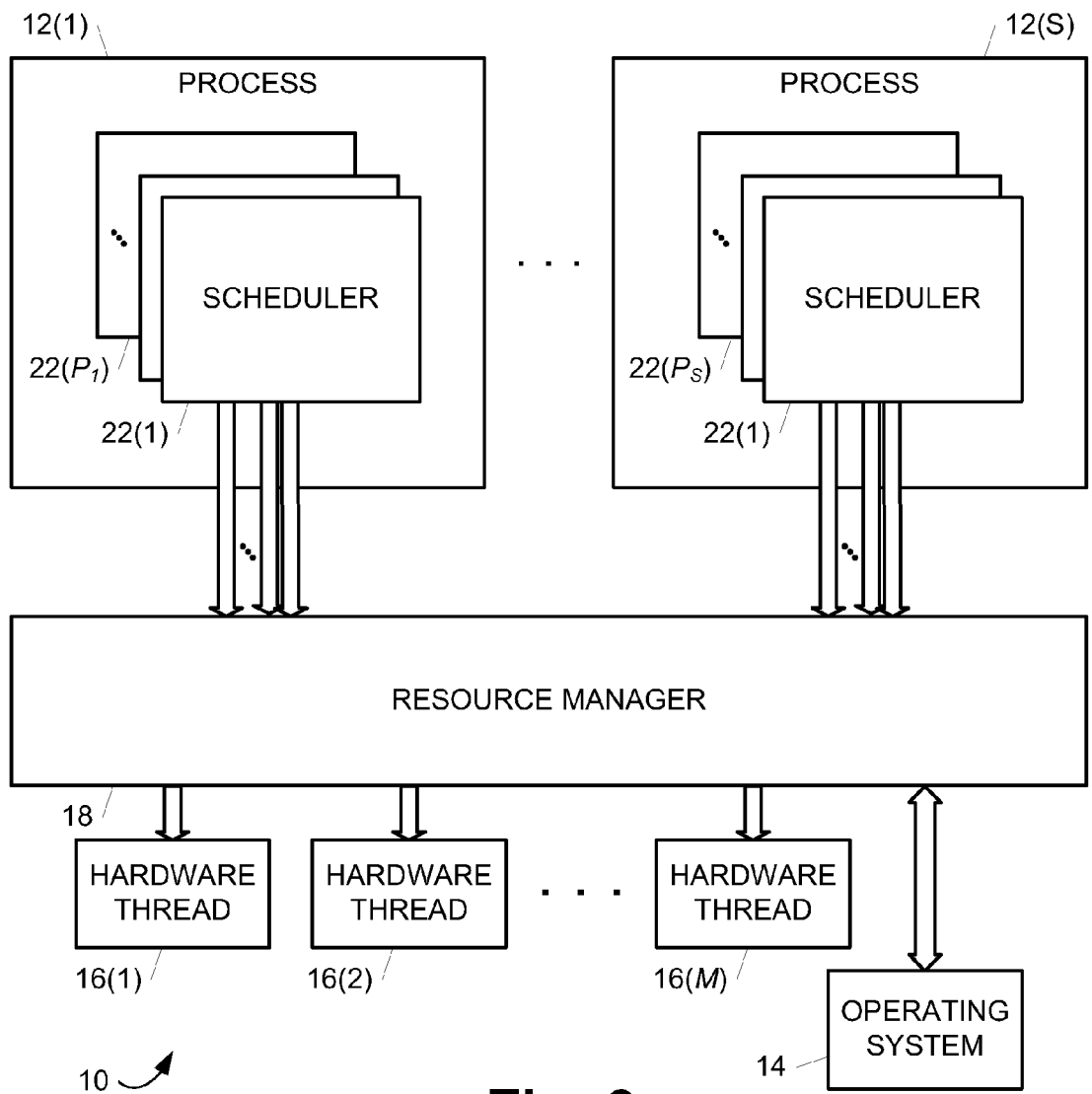
FIG. 6 is a block diagram illustrating an embodiment of a set of processes each with a set of schedulers in a runtime environment.

FIG. 6 is a block diagram illustrating an embodiment of a set of processes 12(1)-12(S), where S is an integer that is greater than or equal to two and denotes the Sth process 12(S), where each process 12 includes a set of schedulers 22 in runtime environment 10.

In addition to dynamically allocating processing resources and other resources between schedulers 22 in a process 12, resource manager 18 may also dynamically allocate processing resources and other resources between schedulers 12 in different processes 12 in the embodiments of FIGS. 1-4 described above. Accordingly, resource manager 18 may allocate the processing resources and other resources to each scheduler 22 in each process 12(1)-12(S), monitor the amount of use of the resources by the schedulers 22 in each process 12(1)-12(S), and dynamically adjust the resources of schedulers 22 in each process 12(1)-12(S).

Figure 7:
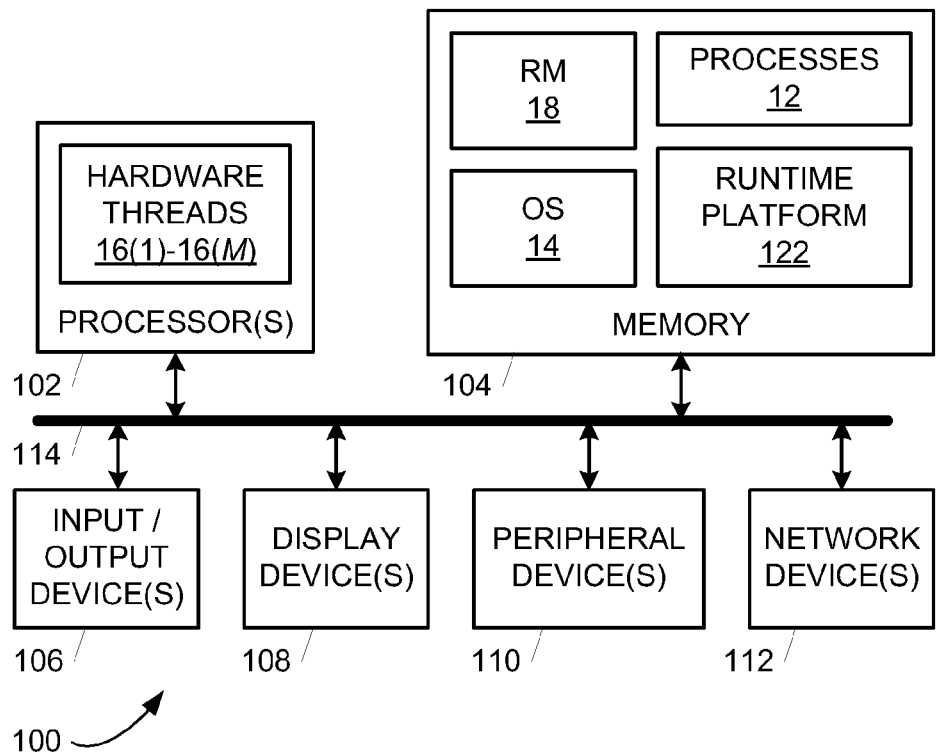
FIG. 7 is a block diagram illustrating an embodiment of a computer system configured to implement a runtime environment that includes a scheduler in a process.

FIG. 7 is a block diagram illustrating an embodiment of computer system 100 which is configured to implement runtime environment 10 including one or more schedulers 22 in one or more processes 12 where each scheduler 22 is configured to schedule execution contexts for execution by processing resources as described above.

Computer system 100 includes one or more processor packages 102, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), processes 12, OS 14 (also shown in FIG. 1), a runtime platform 122, and resource manager 18 (also shown in FIG. 1). Each hardware thread 16 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions including processes 12, OS 14, resource manager 18, and runtime platform 122. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of processes 12, OS 14, resource manager 18, and runtime platform 122 described herein. Examples of storage devices in memory system 104 include hard disk drives, random access memory (RAM), read only memory (ROM), flash memory drives and cards, and magnetic and optical disks.

Computer system 100 boots and executes OS 14. OS 14 includes instructions executable by hardware threads 16 to manage the components of computer system 100 and provide a set of functions that allow processes 12 to access and use the components. In one embodiment, OS 14 is the Windows operating system. In other embodiments, OS 14 is another operating system suitable for use with computer system 100.

Resource manager 18 includes instructions that are executable in conjunction with OS 14 to allocate resources of computer system 100 including hardware threads 16 as described above with reference to FIG. 1. Resource manager 18 may be included in computer system 100 as a library of functions available to one or more processes 12 or as an integrated part of OS 14, for example.

Runtime platform 122 includes instructions that are executable in conjunction with OS 14 and resource manager 18 to generate runtime environment 10 and provide runtime functions to processes 12. These runtime functions include a scheduler function as described in additional detail above with reference to FIG. 1. The runtime functions may be included in computer system 100 as part of a process 12, as a library of functions available to one or more processes 12, or as an integrated part of OS 14 and/or resource manager 18.

Each process 12 includes instructions that are executable in conjunction with OS 14, resource manager 18, and/or runtime platform 122 to cause desired operations to be performed by computer system 100. Each process 12 may execute with one or more schedulers 22 as provided by runtime platform 122. The processes 12 may form one or more applications that may be executed by computer system 100.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Figure 8:
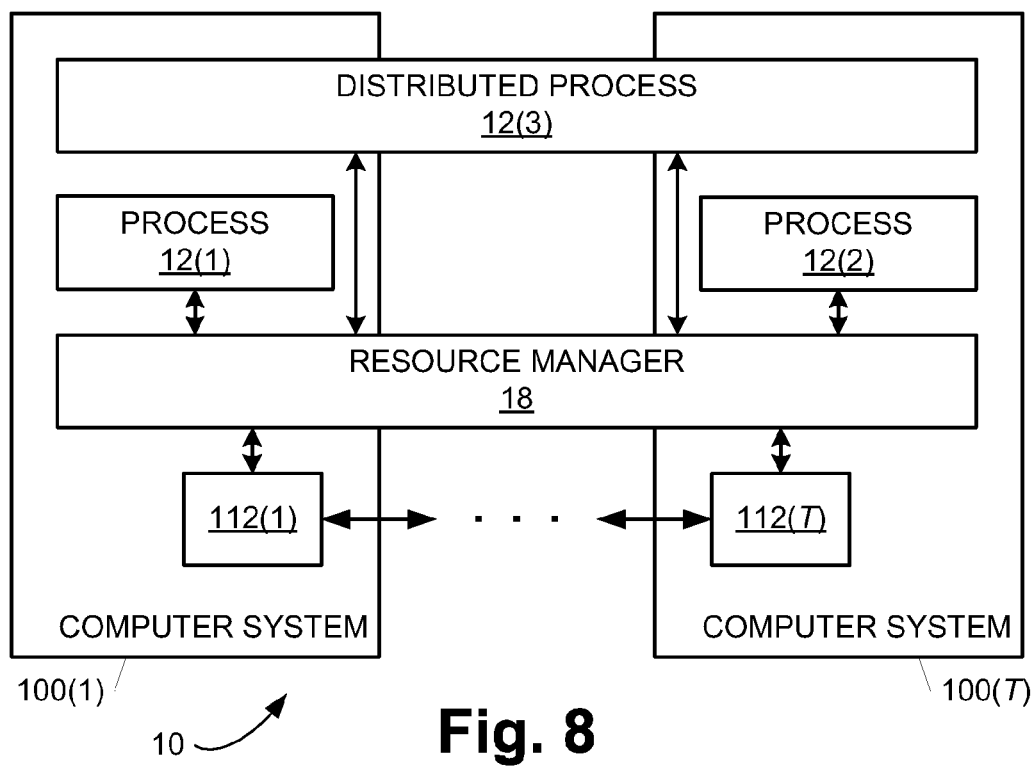
FIG. 8 is a block diagram illustrating an embodiment of a runtime environment that extends across multiple computer systems.

FIG. 8 is a block diagram illustrating an embodiment of a runtime environment 10 that extends across multiple computer systems 100(1)-100(T), where T is an integer that is greater than or equal to two and denotes the Tth computer system 100(T). Computer systems 100(1)-100(T) communicate using any suitable type and number of interconnections between network devices 112(1)-112(T).

FIG. 8 illustrates that the execution of resource manager 18 may extend across any number of computer systems 100(1)-100(T) to dynamically allocate processing and other resources among schedulers 22 in processes 12 executing on or across computer systems 100(1)-100(T). Resource manager 18 may use any suitable proxies or sub-processes to execute across multiple computer systems 100(1)-100(T).

Each process 12 may execute on a single computer system 100 (e.g., processes 12(1) and 12(2)) or across multiple computer systems 100 (e.g., distributed process 12(3)) using any suitable proxies or sub-processes. Accordingly, resource manager 18 may allocate processing resources and other resources of computer systems 100(1)-100(T) to each scheduler 22 in each process 12 (e.g., processes 12(1)-12(3)) across computer systems 100(1)-100(T), monitor the amount of use of the resources by the schedulers 22 in each process 12 across computer systems 100(1)-100(T), and dynamically adjust the resources of schedulers 22 in each process 12 across computer systems 100(1)-100(T).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer memory storing computer-executable instructions that, when executed by at least one computer system, perform a method comprising:
    registering at a resource manager a first scheduler, the first scheduler separate from the resource manager;
    receiving at the resource manager a request from the first scheduler for processing resources;
    receiving at the resource manager, first information that describes a first amount of use of a first set of resources allocated to the first scheduler of a first process; and
    adjusting, by the resource manager, the first set of resources allocated to the first scheduler in accordance with the first information, the resource manager adjusting processing resources to the first scheduler by providing an array of interfaces to a plurality of virtual processor roots and a count of a number of array element to the first scheduler;
    wherein the first scheduler creates a virtual processor for each interface to a virtual processor root and maps each virtual processor to a corresponding virtual processor root, wherein the virtual processor root maps to a respective hardware thread of the computer system.

2. The computer memory of claim 1, the method further comprising:
    providing a first request for the first information to the first scheduler.

3. The computer memory of claim 1, the method further comprising:
    providing a second request for second information to the first scheduler subsequent to receiving the first information;
    receiving the second information that describes a second amount of use of the first set of resources by the first scheduler; and
    adjusting the first set of resources in accordance with the first information and the second information.

4. The computer memory of claim 1, the method further comprising:
    adjusting the first set of resources in accordance with the first information and a set of policies of the first scheduler.

5. The computer memory of claim 1, wherein at least one resource in the first set of resources includes a virtual processor that maps to a hardware thread of the computer system.

6. The computer memory of claim 1, the method further comprising:
    receiving second information that describes a second amount of use of a second set of resources by a second scheduler of the first process; and
    adjusting the second set of resources in accordance with the second information.

7. The computer memory of claim 1, the method further comprising:
    receiving second information that describes a second amount of use of a second set of resources by a second scheduler of a second process that is executing concurrently with the first process; and
    adjusting the second set of resources in accordance with the second information.

8. The computer memory of claim 7, the method further comprising:
    adjusting the first set of resources in accordance with the first information and the second information; and
    adjusting the second set of resources in accordance with the first information and the second information.

9. The computer memory of claim 1, wherein the first set of resources include one or more of a processing resource, an execution context, a memory resource, and a network resource.

10. A method performed by at least one computer system, the method comprising:
    registering a first scheduler of a process with a resource manager, separate from the resource manager, to create a first interface in the resource manager;

requesting from the resource manager processing resources;

obtaining policy information about the first scheduler, in response to the request for processing resources;

allocating, by the resources manager, a first set of processing resources to the first scheduler using a second interface in the first scheduler;

requesting first information from the first scheduler that describes a first amount of processing performed by the first set of processing resources using the second interface; and adjusting, by the resource manager, according to the obtained policy information, a first number of processing resources allocated to the first scheduler in the first set in response to receiving the first information using the second interface, the resource manager adjusting processing resources to the first scheduler by providing an array of interfaces to a plurality of virtual processor roots and a count of a number of array element to the first scheduler;

wherein the first scheduler creates a virtual processor for each interface to a virtual processor root and maps each virtual processor to a corresponding virtual processor root, wherein the virtual processor root maps to a respective hardware thread of the computer system.

11. The method of claim 10 further comprising:

activating each of the first set of processing resources using the first interface; and dispatching a respective execution context on each of the first set of processing resources using the second interface in response to the activating.

12. The method of claim 10 further comprising:

adjusting the first number of processing resources in the first set by adding a processing resource to the first set using the second interface.

13. The method of claim 10 further comprising:

adjusting the first number of processing resources in the first set by removing a processing resource from the first set using the second interface.

14. The method of claim 10 further comprising:

registering a second scheduler of the process with the resource manager to create a third interface in the resource manager;

allocating a second set of processing resources to the second scheduler using a fourth interface in the second scheduler;

requesting second information that describes a second amount of processing performed by the second set of processing resources using the fourth interface; and adjusting a second number of processing resources in the second set in response to receiving the second information using the fourth interface.

15. The method of claim 14 further comprising:

creating a scheduler bundle using the first interface; and adding the first and the second schedulers to the scheduler bundle using the first interface.

16. A computer memory storing computer-executable instructions that, when executed on at least one computer system, perform a method comprising:

requesting by a first scheduler or a second scheduler processing resources from a resource manager;

receiving in response to the request, at the resource manager, first information that describes a first amount of processing performed by a first set of processing resources in the first scheduler of a process and receiving, at the resource manager, a first set of policies of the first scheduler;

receiving in response to the request, at the resource manager, second information that describes a second amount of processing performed by a second set of processing resources in the second scheduler of the process and receiving, at the resource manager, a second set of policies of the second scheduler;

adjusting, by the resource manager, a first number of processing resources in the first set and a second number of processing resources in the second set in accordance with the first information, the second information, the first set of policies, and the second set of policies, wherein the resource manager adjusts processing resources to the first or the second scheduler by providing an array of interfaces to a plurality of virtual processor roots and a count of a number of array elements to the first or second scheduler; and creating by either the first or the second scheduler, a virtual processor for each interface to a virtual processor root and mapping each virtual processor to a corresponding virtual processor root, wherein the virtual processor root maps to a respective hardware thread of the computer system;

wherein the resource manager is separate from the first scheduler and from the second scheduler.

17. The computer memory of claim 16, the method further comprising:

receiving third information that describes a third amount of processing performed by the first set of processing resources in the first scheduler subsequent to receiving the first information;

receiving fourth information that describes a fourth amount of processing performed by the second set of processing resources in the second scheduler subsequent to receiving the second information; and adjusting the first number of processing resources in the first set and the second number of processing resources in the second set in accordance with the first information, the second information, the third information, the fourth information, the first set of policies, and the second set of policies.

18. The computer memory of claim 17, wherein each processing resource in the first set of processing resources and the second set of processing resources includes a respective virtual processor that maps to a respective hardware thread of the computer system.

19. The computer memory of claim 18, wherein the first information includes a first number of arrived tasks and a second number of completed tasks, and wherein the second information includes a third number of arrived tasks and a fourth number of completed tasks.

20. The computer memory of claim 19, wherein the first information includes a fifth number of tasks in the first scheduler, and wherein the second information includes a sixth number of tasks in the second scheduler.

21. A computing system comprising:

at least one processor and at least one memory;

a first scheduler that schedules tasks of a process for execution by one or more hardware threads, the first scheduler further creates a virtual processor for each interface to a virtual processor root and maps each virtual processor to a corresponding virtual processor root, wherein the virtual processor root maps to a respective one of the one or more hardware threads of the computer system; and a resource manager separated from the first scheduler, the resource manager registers the first scheduler, receives a request from the first scheduler for processing resources, receives , first information that describes a first amount of use of a first set of resources allocated to the first scheduler of a first process, and adjusts the first set of resources allocated to the first scheduler in accordance with the first information, the resource manager adjusts processing resources to the first scheduler by providing an array of interfaces to a plurality of virtual processor roots and a count of a number of array element to the first scheduler.

22. The computing system of claim 21 wherein the resource manager further provides a first request for the first information to the first scheduler.

23. The computing system of claim 22 wherein the resource manager further provides a second request for second information to the first scheduler subsequent to receiving the first information, receives the second information that describes the first set of resources used by the first scheduler and adjusts the first set of resources in accordance with the first information and the second information.

24. The computing system of claim 21 wherein the resource manager further adjusts the first set of resources in accordance with the first information and a set of policies for the first scheduler.

25. The computer system of claim 21 further comprising:
a virtual processor that maps to one of the one or more hardware threads, the virtual processor being one of the at least one resource in the first set of resources.

26. The computer system of claim 21 wherein the resource manager is disposed across more than one computer system.

* * * * *